United States Patent [19]
Talmy et al.

[11] Patent Number: 5,994,610
[45] Date of Patent: Nov. 30, 1999

[54] METHOD OF SUPPRESSING THERMITE REACTIONS IN PLASMA ARC WASTE DESTRUCTION SYSTEM

[75] Inventors: Inna G. Talmy, Gaithersburg; James A. Zaykoski, Beltsville; Curtis A. Martin, Damascus; Jon W. Cofield, Fort Washington, all of Md.

[73] Assignee: The United States of America as represented by the Secretary of the Navy, Washington, D.C.

[21] Appl. No.: 09/074,702

[22] Filed: May 8, 1998

[51] Int. Cl.[6] .............................. A62D 3/00; F23G 11/00; C21B 11/10
[52] U.S. Cl. ......................... 588/201; 588/205; 588/252; 110/346; 110/235; 75/10.21
[58] Field of Search ................................. 588/201, 205, 588/292; 110/346, 235; 75/10.21

[56] References Cited

U.S. PATENT DOCUMENTS

| | | | |
|---|---|---|---|
| 4,960,057 | 10/1990 | Ohshita et al. | 110/345 |
| 5,280,757 | 1/1994 | Carter et al. | 110/346 |
| 5,811,752 | 9/1998 | Titus et al. | 219/121.27 |

FOREIGN PATENT DOCUMENTS

3830259  3/1990  Germany ................................ 110/345

OTHER PUBLICATIONS

USEPA Handbook, "Vitrification Technologies for Treatment of Hazardous and Radioactive Waste", p1–1:1–3 and 2–1:3–10), May 1992.

*Primary Examiner*—Gary P. Straub
*Assistant Examiner*—Melanie C Wong
*Attorney, Agent, or Firm*—John Forrest; Roger D. Johnson

[57] ABSTRACT

A method of preventing thermite reactions during the high temperature incineration (slag temperature greater than 1200° C.) of waste material streams containing aluminum and iron (steel) by mixing a low melting $SiO_2$ containing material such as water glass or a mixture of sand with $NaHCO_3$ or $Na_2CO_3$ with the waste material.

8 Claims, 1 Drawing Sheet

- SYSTEM $SiO_2$ - $2Na_2O \cdot SiO_2$

- SYSTEM SiO$_2$ - 2Na$_2$O·SiO$_2$

METHOD OF SUPPRESSING THERMITE REACTIONS IN PLASMA ARC WASTE DESTRUCTION SYSTEM

BACKGROUND

This invention relates to methods of waste disposal and more particularly to methods of waste disposal using incinerators.

The U.S. Navy is currently developing a highly efficient shipboard waste destruction system which employs high temperature incineration (>1200° C.) to process Navy solid wastes primarily consisting of cardboard, paper, steel, aluminum, glass, and food. The products of this processing will be carbon dioxide and water (released as gases), and a slag composed of residual inorganic compounds. The composition, melting behavior, and properties of the slags will depend on the composition of the waste stream and processing temperature and atmosphere. Because of shipboard size and weight limitations, the design of existing land-based incinerators (including commercial plasma reactors) cannot be adopted by the Navy.

It is desirable that the incineration waste destruction process be made as safe as possible. In particular, it is desirable to prevent catastrophic failures of the system when it is used during fleet operations at sea.

SUMMARY

Accordingly, an object of this invention is to provide an improved method of destroying waste by high temperature incineration.

Another object of this invention is to provide an safer method of incinerating waste at high temperatures.

A further object of this invention is to prevent thermite reactions which can destroy high temperature incinerators.

Still another object of this invention is to prevent thermite reactions from destroying shipboard incinerators when they are processing the waste streams which occur on ships during the operation of the fleet at sea.

These and other objects of this invention are achieved by providing a process for converting waste materials to slag by high temperature incineration in an oxidizing atmosphere, the improvement comprising:

prior to incineration, mixing with the waste materials a silicon dioxide ($SiO_2$) containing material that is
(1) water glass or
(2) a mixture of
   (a) sand ($SiO_2$) and
   (b) a $Na_2O$ precursor that is sodium bicarbonate ($NaHCO_3$), sodium carbonate ($Na_2CO_3$), or mixtures thereof,
   wherein the weight ratio of $SiO_2$ to the $Na_2O$ precursor is selected to produce a molar ratio of $SiO_2$ to $Na_2O$ of from 1.4:1 to 3.5:1 (m.p. ~1000° C.).

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein:

The FIGURE is a phase diagram of the $Na_2O$—$SiO_2$ system.

DESCRIPTION

Figure 1:
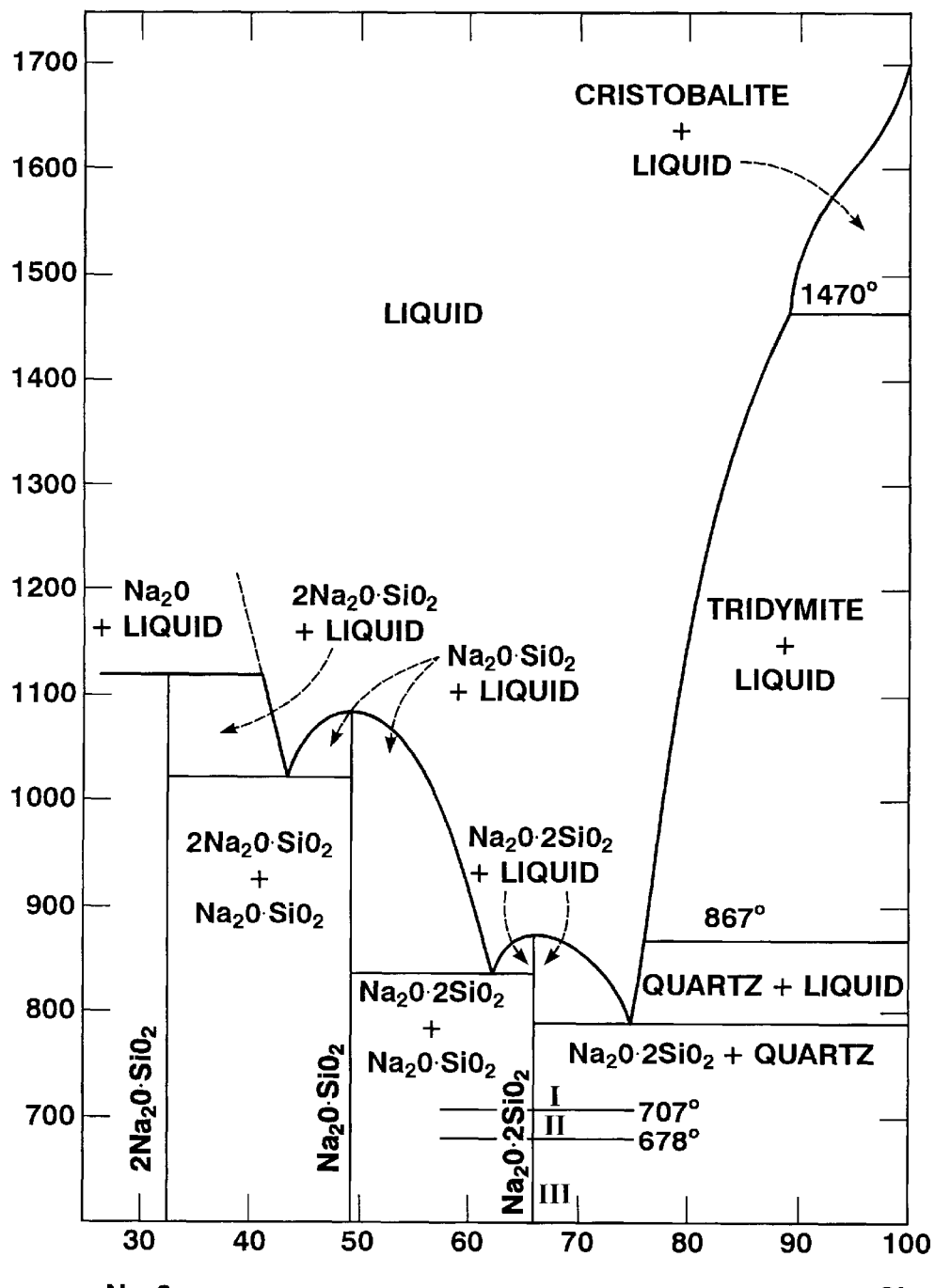

The U.S. Navy's waste destruction system will provide a compact, lightweight, efficient system for converting solid wastes (paper, glass, aluminum cans, steel ("tin") cans, and food) into $CO_2$ and water (as gases) and a solid slag composed of the residual inorganic materials. The process requires an oxidizing atmosphere (air, oxygen enriched air, or steam) in order to oxidize the organic material to $CO_2$ and water. The temperature of the slag is from 1400 to 1500° C. in order to achieve a fully molten slag which will solidify to a solid slag product rather than ashes.

During fleet operations at sea, breakable glass containers are generally replaced by plastic and metal containers. As a result, the waste streams being processed by the incineration systems will contain little if any glass. We have discovered that when a glass poor waste stream containing aluminum and steel is processed in the high temperature environment of the incinerator, a violent thermite reaction occurs. The thermite reaction generates enough heat and thermal shock to damage or destroy the incineration equipment. The present invention provides an inexpensive, effective method of preventing the thermite reaction.

During the high temperature incineration process in oxidizing atmosphere, aluminum and iron (steel) are converted to their oxides. In the absence of glass, the maximum rate of oxidation of iron (steel) is below 1200° C. and the maximum rate of oxidation of aluminum occurs at 1375° C. As a result, at 1200° C. molten aluminum metal is in contact with iron oxides (FeO, $Fe_3O_4$, $Fe_2O_3$) and a violent thermite reaction between the aluminum metal and iron oxides is initiated.

Note that in nominal trash, the presence of substantial amounts of bottle glass (m.p. 1050° C.) suppresses the thermite reaction by physical separation of the iron oxides and aluminum by the glass melt and by chemical oxidation of the aluminum to $Al_2O_3$. By experiment, we have shown that $SiO_2$ prevents or inhibits the thermite reaction by oxidizing aluminum to $Al_2O_3$: $2SiO_2+2Al \rightarrow Al_2O_3+Si+SiO\uparrow$ at temperatures below 1200° C. Note when an equal amount of sand (m.p.~1700° C.), was substituted for the bottle glass, the violent thermite reaction still occurred. This shows that the $SiO_2$ containing compound must be molten to mix with and effectively oxidize the aluminum. The oxidation of the aluminum must occur below 1200° C., the initiation temperature of the thermite reaction between aluminum and iron oxides.

In general, the lower the melting point of the $SiO_2$ containing material, the smaller the amount of the material needed to suppress the violent thermite reaction. Specifically, the farther below 1200° C. that the $SiO_2$ containing material melts, the more time the $SiO_2$ will have to oxidize the aluminum before the thermite reaction initiation temperature is reached. Also, the lower the melting point of the $SiO_2$ containing material, the less viscous the molten material will tend to be. A lower viscosity means that the $SiO_2$ can mix more uniformly and effectively reach and oxidize the aluminum.

The relationship of low melting point and effectiveness of a $SiO_2$ containing material to oxidize the aluminum and prevent a violent thermite reaction can be illustrated by several examples. (Note: percentage of glass refers to the weight percentage of the $SiO_2$ containing material as a percentage of the weight percentage (7.72) of glass in the Nominal 1 waste stream, discussed below. Thus, 50% of glass would correspond to 3.86 weight percent of the waste stream being the $SiO_2$ containing material). When sodium/potassium/calcium feldspar ($0.8(Na_{0.72}K_{0.28})AlSi_3O_8/0.2(CaAl_2Si_2O_8)$) (m.p. 1100° C.) was used, 65% of glass (~5.02 weight percent of waste stream) of the feldspar was needed to suppress the thermite reaction. Bottle glass (sodium aluminosilicate) (m.p. 1050° C.) required 50% of glass (3.86 weight percent of the waste stream) to suppress the violent thermite reaction; a mild thermite reaction was observed. In contrast, only 30% of glass (~2.32 weight percent of waste stream) was needed when water glass ($Na_2O.3.22SiO_2$) (m.p.~800° C.) was used to suppress the thermite reaction. Although water glass works well, a less expensive alternative is preferred.

FIG. 1 is the $Na_2O$—$SiO_2$ phase diagram taken from F. C. Kracek, *J. Phys. Chem.*, 34, 1588 (1930); *J Am. Chem. Soc.*, 61, 2869 (1930), herein incorporated by reference in its entirety. The phase diagram is given in mole percent of $SiO_2$ in the $Na_2O$—$SiO_2$ compositions. The molar ratio of $SiO_2$ to $Na_2O$ is preferably from about 1.4:1 to about 3.5:1, with from 2:1 to 3.25:1 being more preferred. Most preferred is the eutectic composition which occurs at a molar ratio of $SiO_2$ to $NaO_2$ of about 3:1.

It is desirable that inexpensive, safe, convenient materials be added to the waste stream to create the $SiO_2$—$Na_2O$ molten material in the slag. Sand is an excellent source of the $SiO_2$. However, $Na_2O$ (or $NaOH$) is a deliquescent, corrosive material which is unsuitable for this process. Therefore, a suitable $Na_2O$ precursor which will decompose to form $Na_2O$ during the heating process is needed. Certain salts such as $Na_2SO_4$, $NaCl$ are undesirable because they produce sulfur or chlorine containing gases upon decomposition. We have found that $NaHCO_3$, $Na_2CO_3$, or mixtures thereof are the preferred precursors for $Na_2O$. The weight ratio of sand($SiO_2$) to $NaHCO_3$ required to produce a specific $SiO_2$:$Na_2O$ molar ratio can be calculated using the stoichiometry of the reaction

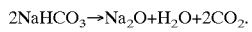
$2NaHCO_3 \rightarrow Na_2O+H_2O+2CO_2$.

Similarly, the weight ratio of sand to $Na_2CO_3$ required to produce a specific $SiO_2$:$Na_2O$ molar ratio can be calculated using the stoichiometry of the reaction

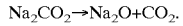
$Na_2CO_2 \rightarrow Na_2O+CO_2$.

It is important that the $SiO_2$ containing compound or the mixture of sand and $NaHCO_3$ or $Na_2CO_3$ or mixtures thereof are mixed in with the waste material as thoroughly as is practical before incineration. This is necessary to produce an even distribution of the molten $SiO_2$ containing material throughout the slag which will prevent localized thermite reactions which can damage the equipment.

When (1) water glass or (2) a mixture of sand with $NaHCO_3$ or $Na_2CO_3$ or a mixture of $NaHCO_3$ and $Na_2CO_3$ is added to the waste stream, the amount added will preferably be about 2.3 or more and more preferably 2.5 or more weight percent of the total waste stream. The upper limit of the weight percentage of water glass or sand/$NaHCO_3$ or sand/$Na_2CO_3$ added is determined by economics rather than operability of the process.

EXPERIMENTAL

The Navy "nominal" solid waste stream, consisting (by weight) of 66.66% paper, 16.40% steel, 7.72% bottle glass (sodium aluminosilicate), 6.91% aluminum, and 6.75% food, was selected for the slag simulation experiments. The paper can contain up to 25% inorganic compounds introduced as fillers. The most common fillers are calcium carbonate ($CaCO_3$) and kaolin ($Al_2O_3.2SiO_2.2H_2O$). During thermal destruction of the paper, the fillers will be converted to calcium oxide (CaO) and mullite ($3Al_2O_3.2SiO_2$) plus some free silica ($SiO_2$), respectively. The nature of the mineral component in the paper will significantly affect the chemical composition, properties (such as melting temperature and viscosity), and handling of the slag.

For the study, the melting experiments were conducted using chopped (3×3 mm squares) steel and aluminum cans, crushed bottle glass, calcium carbonate and/or kaolin to simulate minerals in the paper, and calcium carbonate and phosphoric acid to simulate the mineral part of bones in food. (Bottle glass was assumed to have the following composition (by weight): 72.8% $SiO_2$, 13.8% $Na_2O$, 10.7% CaO, 1.3% $Al_2O_3$, 0.6% $K_2O$, and 0.8% MgO. Food was assumed to contain as much as 10 wt. % bone consisting of 75 wt. % $10CaO.3P_2O_5.H_2O$.)

Due to variability in the mineral content of paper, three parallel sets of experiments were conducted with the assumptions that: 1) the paper contains 16 wt. % calcium carbonate filler (Nominal 1) (yielding about 9 wt. % CaO on decomposition), 2) 10.5 wt. % kaolin filler (Nominal 2) (yielding 9 wt. % mullite) or 3) the paper contains 15 wt. % of 50% $CaCO_3$/50% kaolin filler (Nominal 3) (yielding 10 wt. % of a mixture of CaO, mullite, and silica on decomposition). The amount of filler in the paper was selected on the basis of preliminary laboratory thermal destruction experiments. The latter assumption was selected based on the reality of having a mixture of paper containing both types of fillers in the shipboard waste stream. Accordingly, the waste stream experiments were designated as "Nominal 1" and "Nominal 2", depending on the mineral content in the paper.

Laboratory modeling was conducted to determine the properties of the slags resulting from the waste stream containing all five components, as well as the properties of slags resulting from various waste stream excursions such as "No Steel", "No Glass", "No Paper", or "No Aluminum". These excursions were selected because of the inevitable variations in the composition of the waste stream during normal ship operations. The experiments were performed using 30 to 40 g batches contained in dense 100 ml 99.8% alumina crucibles in an oxidizing atmosphere (air) furnace at 1400–1500° C. with different heating rates (from 2 to 10° C./min) and holding times (15 minutes to 2 hours). X-ray diffraction was used to identify the phase composition of selected slags.

Thermogravimetry/differential thermal analysis (TG/DTA) was used to determine the oxidation and melting behavior of aluminum and steel, alone and in combination with components of the waste stream, especially with glass and $CaCO_3$. The samples were heated at 20° C./min up to 1400° C. in an argon/oxygen atmosphere which simulated the concentration of oxygen in air.

RESULTS

The waste stream composition for "Nominal 1" ($CaCO_3$ containing paper) and four possible excursions of the wastes are summarized in Table 1. Table 2 shows the chemical composition of the Nominal 1, Nominal 2, and Nominal 3 slags. The X-ray diffraction analysis showed no metallic iron or aluminum present in the slags. Iron was oxidized to a mixture of $Fe_3O_4$ and $Fe_2O_3$. The calculated chemical composition of the slags is shown in Table 3. Calculations were performed assuming that iron was oxidized completely to $Fe_3O_4$.

TABLE 1

Waste Stream Variations

| Waste Components | Waste Stream Composition (weight %) | | | | |
|---|---|---|---|---|---|
| | Nominal 1 | No Paper | No Steel | No Al | No Glass |
| Food | 6.75 | 17.87 | 8.07 | 7.25 | 7.31 |
| Paper | 62.22 | — | 74.43 | 66.84 | 67.43 |
| Steel | 16.40 | 43.41 | — | 17.62 | 17.77 |
| Aluminum | 6.91 | 18.29 | 8.27 | — | 7.49 |
| Glass | 7.72 | 20.43 | 9.23 | 8.29 | — |

TABLE 2

Predicted Chemical Composition of Slags Containing Different Types

| | Oxide Content in Various Slags (Weight %) | | |
|---|---|---|---|
| Oxides | Nominal 1 $CaCO_3$ | Nominal 2 with kaolin | Nominal 3 with $CaCO_3$/kaolin |
| $Fe_3O_4$ | 45.60 | 46.93 | 46.84 |
| $Al_2O_3$ | 26.49 | 31.40 | 29.77 |
| $SiO_2$ | 11.31 | 16.52 | 14.43 |
| CaO | 13.70 | 2.31 | 5.93 |
| $P_2O_5$ | 0.58 | 0.44 | 0.44 |
| $Na_2O$ | 2.14 | 2.21 | 2.19 |
| $Fe_3O_4$/CaO ratio | 3.4 | 20.3 | 7.9 |

TABLE 3

Calculated Chemical Compositions of Slags

| | Oxide Content in Various Slags (weight %) | | | | |
|---|---|---|---|---|---|
| Chemical Compounds | Nominal 1 | Zero Paper | Zero Steel | Zero Al | Zero Glass |
| $Fe_3O_4$ | 46.52 | 50.34 | 0 | 62.80 | 54.81 |
| $Al_2O_3$ | 26.13 | 29.39 | 48.71 | 0.28 | 30.54 |
| $SiO_2$ | 11.15 | 12.54 | 20.77 | 15.05 | 0 |
| CaO | 13.51 | 2.70 | 25.18 | 18.24 | 13.98 |
| $P_2O_5$ | 0.57 | 0.64 | 1.06 | 0.76 | 0.67 |
| $Na_2O$ | 2.11 | 2.38 | 3.94 | 2.86 | 0 |
| $K_2O$ | trace | trace | trace | 0.06 | 0 |
| MgO | 0.12 | 0.14 | 0.23 | 0.17 | 0 |
| $Fe_3O_4$/CaO ratio | 3.4 | 19.4 | 0 | 3.4 | 3.9 |

Heat treatment of the wastes at 1400° C. for 2 hours with a 3° C./minute heating rate formed molten slags for the "Nominal 1", "No Aluminum", and "No Glass" excursions. Compared to that, the slags resulting from the "Nominal 2 and 3" and from "No Paper" and "No Steel" excursions were not fully molten. The melting behavior of the slags was found to be well correlated with the $Fe_2O_3$/CaO weight ratio in the various slag compositions (Table 3). All slags which melted during the experiments had similar ratio values in the range 3.4 to 3.9. Significant deviations from this value in the slags "Nominal 2 and 3", "No Paper", and "No Steel" resulted only in partial melting.

The results indicate the critical importance of the simultaneous presence of calcium and iron oxides, as well as their ratio, for decreasing the melting point of slags. The CaO—$Fe_2O_3$ phase diagram (BERT PHILLIPS and ARMULF MUAN, *J. Am. Ceram Soc.*, 41 [11] 448 (1958)) shows a minimum liquidus temperature of about 1200° C. for the $Fe_2O_3$/CaO weight ratio ranging from 3.16 to 4.13, which is in the range of ratios corresponding to the low melting slags in the present experiments (Table 3). According to the phase diagram, even a small deviation in composition from the low melting range results in significant increases in liquidus temperatures confirming results obtained for "Nominal 2", "No Paper", and "No Steel" slags.

The slags resulting from the "No Glass" excursions of "Nominal 1, 2, and 3" exhibited boiling and splashing, as well as cracking and partial melting of the crucible. This phenomenon is attributed to a severe thermite reaction, as a result of chemical interaction between iron oxide and aluminum. The heat generated by reaction resulted in an instantaneous increase of temperature, probably in excess of 2050° C. (the melting temperature of alumina) leading to cracking (due thermal shock) and melting of the crucible and leaking of the slags. The temperature for the initiation of the reaction was determined to be 1200° C. by instrumenting the furnace with thermocouples and power input monitoring devices.

The results of TG/DTA of aluminum and steel, alone and combined with glass and $CaCO_3$ verify that the oxidation behavior of steel and aluminum leads to the development of the thermite reaction. A DTA curve of the aluminum showed an endothermic peak at 660° C. corresponding to the melting of aluminum and an exothermic peak at 1375° C. corresponding to the maximum rate of aluminum oxidation reaction ($4Al+3O_2 \rightarrow 2Al_2O_3$). The maximum oxidation rate for aluminum, whether it is alone or in combination with $CaCO_3$, occurs at 1375° C. This temperature is lowered to about 1200° C. for the aluminum/glass combination.

In contrast, the maximum rate of steel oxidation ($3Fe+2O_2 \rightarrow Fe_3O_4$) was observed at 1150° C. For the combination of steel with $CaCO_3$, the maximum rate of oxidation took place at 1000° C.; and for the steel/glass combination, three separate oxidation events occurred, with the first at 1118° C. Therefore, the maximum rate of oxidation of steel occurs at a temperature lower than that of aluminum. The high temperature for oxidation of aluminum is due to the formation of a passivating surface layer of aluminum oxide. The significance of the TG/DTA results is that it shows that during the processing of Navy wastes, steel will be oxidized before aluminum, creating favorable conditions for the occurrence of the thermite reaction.

For the thermite reaction in which $Fe_3O_4$ reacts with aluminum according to $3Fe_3O_4+8Al \rightarrow 9Fe+4Al_2O_3$, the $Fe_3O_4$/Al ratio (by weight) for this stoichiometric reaction is 3.22. In the "Nominal 1" Navy waste stream (Table 1), if iron is assumed to be completely converted to $Fe_3O_4$ (neglecting carbon and other alloying elements in the steel), the $Fe_3O_4$/Al ratio would be 3.27. Hence, even the "Nominal 1" Navy waste stream has the potential to create a near stoichiometric thermite reaction during processing. However, the occurrence of the thermite reaction only in the "No Glass" excursion suggests the critical importance of the presence of a glass melt (glass melting temperature was determined to be about 1050° C.) for suppression of the reaction.

The protective function of the glass melt is probably the result of physical separation of aluminum from iron oxide, as well as, the result of an oxidation-reduction reaction in which silica in the glass is reduced by aluminum according to the reaction: $2SiO_2+2Al \rightarrow Si+Al_2O_3+SiO\uparrow$ to form silicon, alumina, and silicon monoxide (gas). By this reaction, metallic aluminum is oxidized about 800° C. and is not available for participation in the thermite reaction (ignition temperature about 1200° C.) with iron oxides. Experimental confirmation of the occurrence of the oxidation-reduction reaction was provided by heating (in air and in helium) pieces of aluminum buried in crushed bottle glass to 1400° C. for 30 minutes. Regardless of the atmosphere in the furnace, the same results were observed: a black coloration of the glass melt indicating the presence of elemental silicon which was confirmed by x-ray photoelectron spectroscopy (XPS), and bubbles in the melt, particularly at the aluminum/glass interface, suggesting the formation of gaseous SiO.

To identify the minimum content of glass required for the suppression of the thermite reaction, the series of waste compositions was investigated having 15, 30, and 50 wt. % of glass normally present in the "nominal" waste stream. Experiments were conducted using "Nominal 1" waste stream ($CaCO_3$-containing paper) as a baseline. The 15 and 30% glass excursions exhibited severe thermite reactions and destruction of the alumina crucibles. Very weak thermite reaction was observed in the slag containing 50% of the nominal glass content. Thus, at least 50% of the glass as contained in the "nominal" waste stream is necessary to prevent the thermite reaction during the thermal destruction of Navy waste.

As it was mentioned above, even the "Nominal 1" Navy waste stream compositions have the potential to develop thermite reaction during processing. The metallic droplets that were occasionally observed in the "Nominal 1" slag are considered as "secondary" iron from the thermite reaction confirming the occurrence of the reaction. To characterize the effect of excess of glass on melting behavior of the slags and development of thermite reaction, the slags containing 25 and 50% excess of glass were prepared and evaluated. The melting behavior of the slags are described in Table 4. The data indicate that slags with excess of glass have improved melting behavior compared to the "Nominal 1" slag. The slags did not contain any "secondary" iron droplets proving that the thermite reaction did not occur during melting experiments.

TABLE 4

Results of Simulation Experiments on Slags with Various Glass Content

| Waste Stream Variation, % Glass | Heating Temp. (° C.) | Melting Behavior |
|---|---|---|
| 0 (Zero Glass) | 1400 | complete melting, severe thermite reaction and corrosion of crucible, secondary iron present |
| 15 | 1400 | complete melting, severe thermite reaction and corrosion of crucible, secondary iron present |
| 30 | 1400 | complete melting, thermite reaction, severe cracking of crucible, secondary iron present |
| 50 | 1400 | complete melting, very weak thermite reaction, no corrosion of crucible, some secondary iron present |
| 100 (Nominal) | 1400 | complete melting, weak thermite reaction is possible, no corrosion of crucible, occasional presence of secondary iron |
| 125 | 1400 | complete melting, no thermite reaction, no secondary iron present |
| 150 | 1400 | complete melting, no thermite reaction, no secondary iron present |

To prevent the thermite reaction in the case of the total absence of glass while at sea, silicon oxide-containing alternative materials were investigated. Sand was selected as the primary substitute for glass, based on its availability and low cost. However, the introduction of sand as 100% replacement for glass in the "Nominal 1" waste stream composition resulted in a severe thermite reaction. The occurrence of the thermite reaction during the processing of the sand-containing waste stream can be related to the very high melting temperature of sand (about 1700° C.), resulting in the absence of a melt at temperatures below the ignition point of the thermite reaction (1200° C.). The melt, uniformly distributed between the waste particles, creates conditions for both physical and chemical means to prevent the thermite reaction, as observed in the bottle glass-containing slag with glass melting temperature about 1050° C.

Fluxes containing sand and soda ($NaHCO_3$) with $SiO_2$:$Na_2O$ molar ratios of 3:1, 2:1, and 1:1 were used instead of glass in the "Nominal 1" waste stream. On the basis of the $SiO_2$—$Na_2O$ phase diagram shown in the figure (which is taken from F. C. Kracek, *J. Phys. Chem.*, 34, 1588 (1930), hereby incorporated by reference in its entirety), the melting temperatures of the selected compositions are about 793, 874 and 1089° C., respectively. To determine the minimum amounts of the mixtures required to prevent the thermite reaction, all three fluxing mixtures with $SiO_2$:$Na_2O$ ratios of 3:1, 2:1, and 1:1 were introduced at 15 to 100% of the normal glass content. The chemical composition of the slags is given in Tables 5, 6, and 7.

TABLE 5

Chemical Composition of Slags with Variations in Sand/$NaHCO_3$ Content ($SiO_2$/$Na_2O$ ratio 1:1) Introduced as substitution for Glass

| | Oxide Content (weight %) in Slags | | | |
|---|---|---|---|---|
| Oxide 1400° C., 2 hr | 0 ("Zero Glass") Thermite | 30% Sand/ $NaHCO_3$ Thermite | 60% Sand/ $NaHCO_3$ No thermite | 100% ("Nominal") No thermite |
| $Fe_3O_4$ | 53.98 | 51.32 | 48.76 | 45.60 |
| CaO | 14.24 | 13.34 | 12.67 | 13.70 |
| $Al_2O_3$ | 31.11 | 29.60 | 28.12 | 26.49 |
| $SiO_2$ | — | 2.63 | 4.99 | 11.31 |
| $Na_2O$ | — | 2.63 | 4.99 | 2.14 |
| $P_2O_5$ | 0.68 | 0.49 | 0.46 | 0.58 |

TABLE 6

Chemical Composition of Slags with Variations in Sand/$NaHCO_3$ Content ($SiO_2$/$Na_2O$ ratio 2:1) Introduced as Substitution for Glass

| | Oxide Content (weight %) in Slags | | | | |
|---|---|---|---|---|---|
| Oxide 1400° C., 2 hr | 0 "No Glass" Thermite | 15% Sand/ $NaHCO_3$ Thermite | 30% Sand/ $NaHCO_3$ No thermite | 60% Sand/ $NaHCO_3$ No thermite | 100% ("Nominal") No thermite |
| $Fe_3O_4$ | 53.98 | 52.71 | 51.32 | 48.76 | 45.60 |
| CaO | 14.24 | 13.70 | 13.34 | 12.67 | 13.70 |
| $Al_2O_3$ | 31.11 | 30.40 | 29.60 | 28.12 | 26.49 |
| $SiO_2$ | — | 1.80 | 3.5 | 6.65 | 11.31 |
| $Na_2O$ | — | 0.90 | 1.75 | 3.33 | 2.14 |
| $P_2O_5$ | 0.68 | 0.50 | 0.49 | 0.46 | 0.58 |

TABLE 7

Chemical Composition of Slags with Variations in Sand/NaHCO₃ Content (SiO₂/Na₂O ratio 3:1) Introduced as Substitution for Glass

| | Oxide Content (weight %) in Slags | | | |
|---|---|---|---|---|
| Oxide 1400° C., 2 hr | 0 ("Zero Glass") Thermite | 15% Sand/ NaHCO₃ Thermite | 30% Sand/ NaHCO₃ No thermite | 100% ("Nominal") No thermite |
| Fe₃O₄ | 53.98 | 52.71 | 51.32 | 45.60 |
| CaO | 14.24 | 13.7 | 13.34 | 13.70 |
| Al₂O₃ | 31.11 | 30.40 | 29.60 | 26.49 |
| SiO₂ | — | 2.02 | 3.94 | 11.31 |
| Na₂O | — | 0.67 | 1.31 | 2.14 |
| P₂O₅ | 0.68 | 0.50 | 0.49 | 0.58 |

The addition of only 30% sand/soda mixtures with the SiO₂:Na₂O ratios of 3:1 and 2:1 as a replacement for glass resulted in the complete suppression of the thermite reaction, while a 60% substitution of the mixture for the "Nominal 1" glass content was required when the SiO₂:Na₂O ratio was 1:1. The latter can be attributed to much higher melting temperature of the 1:1 mixture, compared to 3:1 and 2:1 ones, which was probably interfering with the maximum realization of melt protective capabilities. Table 8 summarizes the chemical and physical transformations in slags during heating and their effects on the development of the thermite reaction. The "Nominal 1" slag with sand: Na₂O (NaHCO₃) ratio of 2:1 was selected as an example.

TABLE 8

Development of Thermite Reaction in "Nominal" Slags as a Function of Chemical and Physical Transformations of the Components during Heating

| "Nominal 1" with glass | "Nominal 1" with sand | "Nominal 1" with sand + Na₂O (NaHCO₃) 2:1 ratio |
|---|---|---|
| 660° C., Al melts 1050° C., glass melts Al oxidized by redox reaction with SiO₂ | 660° C., Al melts Sand doesn't melt (T_mp ≈ 1700° C.) Redox reaction inefficient in solid state 1000° C., Fe oxidizes | 660° C., Al melts ≈874° C. eutectic in the SiO₂—Na₂O system Al oxidized by redox reaction with SiO₂ |
| 1200° C., thermite reaction ignition temperature | | |
| Weak thermite reaction | Severe thermite reaction | No thermite reaction |

The melt, uniformly distributed between the waste particles, creates conditions for both physical and chemical means to prevent the thermite reaction, as observed in the bottle glass containing slag with glass melting temperature about 1050° C. Contrary to that, in the sand-containing slag (melting point of sand is about 1700° C.), no silica-containing melt exists below 1200° C. to prevent the thermite reaction. In the slag containing sand and soda with SiO₂:Na₂O ratios of 2:1, melt existed at temperatures about 874° C. creating conditions for much longer exposure of metallic Al to the low viscosity silicate melt. In this case only 30% substitution for glass was required for the suppression of the thermite reaction.

The thermite-reaction suppressing effectiveness of fluxes introduced in the form of sodium silicate compounds, instead of the mixed oxides (sand plus soda), was investigated. The introduction of compounds was expected to be more efficient than that of mixed oxides. Sodium silicate (soluble glass) of composition Na₂O.3.22SiO₂(SiO₂:Na₂O= 3.22:1) with a melting temperature about 800° C. was selected as a primary candidate. The water glass had a composition similar to the sand-soda mixture (SiO₂:Na₂O= 3:1) used previously. The additives were introduced at 15 to 100% of the "nominal" glass content. Similar to the sand-soda mixture, the thermite reaction was suppressed by the introduction of 30% of water glass. Table 9 shows the chemical composition and melting behavior of the resulting slags.

TABLE 9

Chemical Composition of Slags with Variations in Sodium Silicate Content

| | Oxide Content (weight %) in Slags with Variations in Na₂O/3.22SiO₂ Content | | | | |
|---|---|---|---|---|---|
| Oxide 1400° C., 2 hr | 0 ("Zero Glass") Thermite | (15% of glass) Thermite | (30% of glass) No thermite | (60% of glass) No thermite | (100% of glass) No thermite |
| Fe₃O₄ | 53.98 | 52.72 | 51.32 | 48.76 | 45.76 |
| CaO | 14.24 | 13.70 | 13.34 | 12.67 | 11.87 |
| Al₂O₃ | 31.11 | 30.40 | 29.60 | 28.12 | 26.34 |
| SiO₂ | — | 2.05 | 4.01 | 7.61 | 11.90 |
| P₂O₅ | 0.68 | 0.50 | 0.49 | 0.46 | 0.43 |
| Na₂O | — | 0.63 | 1.24 | 2.36 | 3.70 |

In the next approach sodium/potassium/calcium feldspar (0.8(Na₀.₇₂K₀.₂₈)AlSi₃O₈/0.2(CaAl₂Si₂O₈)) with melting temperature of about 1100° C. was introduced as 15–100% substitution for glass in the "Nominal 1" slag composition. In this case Na₂O, K₂O, CaO, and SiO₂ were also bonded in the chemical compound. Table 10 shows the chemical composition and melting behavior of the slags.

TABLE 10

Chemical Composition of Slags with Variations in Feldspar Content

| | Oxide Content (weight %) in Slags with Variations in Feldspar Content | | | | |
|---|---|---|---|---|---|
| Oxide 1400° C., 2 hr | 0 ("Zero Glass") Thermite | (40% of glass) Thermite | (65% of glass) No thermite | (100% of glass) No thermite | 100% ("Nominal") No thermite |
| Fe₃O₄ | 53.98 | 50.85 | 48.40 | 45.80 | 45.60 |
| CaO | 14.24 | 13.29 | 12.73 | 12.12 | 13.70 |
| Al₂O₃ | 31.11 | 30.43 | 29.87 | 29.23 | 26.49 |
| SiO₂ | — | 4.26 | 7.33 | 10.70 | 11.31 |
| P₂O₅ | 0.68 | 0.48 | 0.46 | 0.44 | 0.58 |
| Na₂O | — | 0.43 | 0.74 | 1.07 | 2.14 |
| K₂O | — | 0.25 | 0.44 | 0.64 | trace |
| MgO | — | trace | trace | trace | 0.12 |

Compared to sand-soda mixture and water glass, the thermite reaction was suppressed only after substitution of 65% of feldspar for glass. The significant difference in the amounts of the sodium silicate fluxes required to suppress the thermite reaction is probably due to the differences in their melting temperature and viscosity which are both higher for the feldspar. The nature of the sodium oxide/silica-based fluxes (chemical compound or oxide mixtures) did not affect their effectiveness in suppressing the thermite reaction.

The most important condition for suppression of the thermite reaction is the presence of a silicon oxide-containing melt prior to the ignition point of the thermite reaction (1200° C.). The melting temperature of flux strongly influences its effectiveness. Low melting additives allow the melt to have a longer exposure time with the solid components of the slag for the effective utilization of both the physical and chemical protective mechanisms which results in a significant decrease in the amount of the flux required to suppress the thermite reaction. The viscosity of a low melting flux is expected to be significantly lower at temperatures near 1200° C. compared to that of a high melting flux. The low viscosity additionally contributes to the effectiveness of the flux allowing a further decrease in its amount. The advantage of using low melting/low viscosity fluxes is illustrated in Table 11.

TABLE 11

Effect of the Silicon Oxide content and flux Melting Point in Various Slags on Thermite Reaction

| Flux Composition and Amount | | Flux Melting Temperature, ° C. | $SiO_2$ content, % | Thermite Reaction? |
|---|---|---|---|---|
| Glass: | 30% glass | 1050 | 3.8 | yes |
| | 50% glass | 1050 | 6.2 | no |
| | "Nominal" | 1050 | 11.3 | no |
| Feldspar: | 40% of glass | 1100 | 4.3 | yes |
| | 65% of glass | 1100 | 7.3 | no |
| Water Glass | 15% of glass | 800 | 2.0 | yes |
| ($SiO_2/Na_2O$ ratio = 3.22:1) | 30% of glass | 800 | 4.0 | no |
| Sand: | 100% of glass | 1700 | 15.6 | yes |
| Sand + Soda: | 30% of glass | 1089 | 2.6 | yes |
| ($SiO_2/Na_2O$ ratio = 1:1) | 60% of glass | 1089 | 5.0 | no |
| Sand + Soda: | 15% of glass | 874 | 1.8 | yes |
| ($SiO_2/Na_2O$ ratio = 2:1) | 30% of glass | 874 | 3.5 | no |
| Sand + Soda: | 15% of glass | 793 | 2.0 | yes |
| ($SiO_2/Na_2O$ ratio = 3:1) | 30% of glass | 793 | 3.9 | no |

The results show that the melting temperature of the flux correlates directly with the amount of the additive required to suppress the thermite reaction. The additives which melt at lower temperatures are required in smaller amounts than those which melt at higher temperatures. The total silica content in the slag, which depends on both flux amount and composition, does not correlate as well with the melting temperature because of the confounding effect of flux melt viscosity. For example, the two highest melting fluxes, sand/soda with $SiO_2:Na_2O=1:1$ (m.p. 1089° C.) and feldspar (m.p. 1100° C.), which are required in approximately the same amounts (60 and 65%, respectively), have significantly different $SiO_2$ contents (5 and 7.3%, respectively) in the slag. The higher silica content required to prevent the thermite reaction in the feldspar-containing slag can probably be attributed to a much higher viscosity of feldspar melt compared to that of sand/soda melt. The experiments conducted with "Nominal 2 and 3" showed that all the fluxes, which suppressed the thermite reaction in "Nominal 1" ($CaCO_3$-containing paper), also suppress the thermite reaction when introduced into "Nominal 2 and 3" (50% kaolin/ 50% $CaCO_3$-containing paper). However, for the "Nominal 2 and 3" slags, the fluxes which prevented the thermite reaction did not promote their melting. These slags required heating to 1500° C. for complete melting compared to 1400° C. for "Nominal 1 " slags which contained the same fluxes.

Obviously, other modifications and variations of the present invention may be possible in light of the foregoing teachings. It is therefore to be understood that within the scope of the appended claims the invention may be practiced otherwise than as specifically described.

What is claimed is:

1. In a process for converting waste materials containing aluminum and iron (steel) and having a low bottle glass content to slag by high temperature incineration in an oxidizing atmosphere, the improvement comprising:

preventing a thermite reaction between molten aluminum and iron oxides by mixing
   (1) water glass having a molar ratio of $SiO_2$ to $Na_2$ of from 1.4:1 to 3.5:1 or
   (2) a mixture of
       (a) sand ($SiO_2$) and
       (b) a $Na_2O$ precursor that is sodium bicarbonate ($NaHCO_3$), sodium carbonate ($Na_2CO_3$), or mixtures thereof,
       wherein the ratio of $SiO_2$ to the $Na_2O$ precursor is in the molar ratio of $SiO_2$ to $Na_2O$ of from 1.4:1 to 3.5:1,
in with the waste materials in an amount sufficient to oxidize the aluminum to $Al_2O_3$ at a temperature below the temperature at which the thermite reaction between aluminum and iron oxides is initiated.

2. The process of claim 1 wherein said mixture of sand and $Na_2O$ precursor is added to the waste.

3. The process of claim 2 wherein the molar ratio of $SiO_2$ to $Na_2O$ is 2:1 to 3.25:1.

4. The process of claim 3 wherein the molar ratio of $SiO_2$ to $Na_2O$ is about 3:1.

5. The process of claim 1 wherein the waste materials are incinerated at a temperature of 1200° C. or higher.

6. The process of claim 5 wherein the waste materials are incinerated at a temperature of 1400° C. or higher.

7. The process of claim 1 wherein a plasma arc torch is used to incinerate the waste material.

8. The process of claim 7 wherein the plasma arc torch forms a plasma from a group consisting of air, oxygen-enriched air, and steam.

* * * * *